US008817245B2

(12) United States Patent
Archambault et al.

(10) Patent No.: US 8,817,245 B2
(45) Date of Patent: Aug. 26, 2014

(54) HIGH-POWERED OPTICAL MODULE SAFETY SYSTEMS AND METHODS

(75) Inventors: Jean-Luc Archambault, Severna Park, MD (US); Jun Bao, Ellicott City, MD (US)

(73) Assignee: Ciena Corporation, Hanover, MD (US)

(*) Notice: Subject to any disclaimer, the term of this patent is extended or adjusted under 35 U.S.C. 154(b) by 139 days.

(21) Appl. No.: 13/593,212

(22) Filed: Aug. 23, 2012

(65) Prior Publication Data

US 2014/0055777 A1 Feb. 27, 2014

(51) Int. Cl.
*G01N 21/00* (2006.01)
*G01M 11/00* (2006.01)

(52) U.S. Cl.
CPC ......... *G01M 11/3145* (2013.01); *G01M 11/335* (2013.01)
USPC ....................................... 356/73.1

(58) Field of Classification Search
CPC .................................. G01M 11/3145
USPC ......................... 356/73.1; 374/161
See application file for complete search history.

(56) References Cited

U.S. PATENT DOCUMENTS

| 5,532,864 | A | 7/1996 | Alexander et al. |
| 6,163,392 | A | 12/2000 | Condict et al. |
| 6,466,362 | B1 | 10/2002 | Friedrich |
| 6,504,630 | B1 * | 1/2003 | Czarnocha et al. ............. 398/15 |
| 6,519,082 | B2 | 2/2003 | Ghera et al. |
| 6,525,870 | B1 | 2/2003 | Cho et al. |
| 6,547,453 | B1 | 4/2003 | Stummer et al. |
| 6,674,518 | B1 * | 1/2004 | Asher et al. .................. 356/73.1 |
| 6,795,607 | B1 | 9/2004 | Archambault et al. |
| 6,839,523 | B1 | 1/2005 | Roberts |
| 7,483,205 | B1 | 1/2009 | Lundquist et al. |
| 2002/0109906 | A1 | 8/2002 | Grubb et al. |
| 2005/0046929 | A1 | 3/2005 | Grubb et al. |
| 2006/0119931 | A1 | 6/2006 | Ghera et al. |
| 2008/0137178 | A1 * | 6/2008 | Chung et al. .................. 359/321 |
| 2009/0080880 | A1 * | 3/2009 | Lee et al. ......................... 398/14 |
| 2009/0263069 | A1 * | 10/2009 | Hartog ............................ 385/12 |
| 2012/0082469 | A1 * | 4/2012 | Xia et al. ....................... 398/196 |

* cited by examiner

*Primary Examiner* — Tarifur Chowdhury
*Assistant Examiner* — Md Rahman
(74) *Attorney, Agent, or Firm* — Clements Bernard PLLC; Christopher L. Bernard; Lawrence A. Baratta, Jr.

(57) ABSTRACT

A method, optical module, and optical amplifier are configured to detect fiber discontinuities at or near a port from which high powered optical signals are input into a fiber span. These fiber discontinuities can include fiber pinches, and are detected by monitoring for slight changes in a backscatter signal. Detection is quick and efficient based on the backscatter signal being attenuated by the fiber discontinuities twice, namely once as the high powered optical signals and again as the associated backscatter signal of the high powered optical signals returning to the port. Various remedial actions can be taken upon detecting fiber pinches at or near the port.

17 Claims, 5 Drawing Sheets

HIGH-POWERED OPTICAL MODULE SAFETY SYSTEMS AND METHODS

FIELD OF THE INVENTION

Generally, the field of art of the present disclosure pertains to fiber optic systems and methods, and more particularly, to high-powered optical module safety systems and methods which can detect discontinuities such as a fiber pinch and perform automatic, remedial mechanisms based thereon.

BACKGROUND OF THE INVENTION

Conventionally, optical amplifier systems and methods utilize automatic shutdown mechanisms to comply with relevant standards for laser eye safety. Exemplary optical amplifier systems and methods can include Raman amplifiers, Erbium Doped Fiber Amplifiers (EDFAs), and the like. These conventional systems and methods are designed to shut down pumps or the like in an optical amplifier in the event of a fiber cut or open connector. From a detection perspective, fiber cuts are detected by a loss of signal such as, for example, due to an interruption of an optical service channel (OSC). Open connections can be detected using a back reflection monitor which can be a combination of an optical tap and a photodetector. Conventional safety shutdown/detection mechanisms in optical amplifiers are designed to meet eye safety standards, and are focused on detecting fiber breaks or open connectors. Another potential safety issue with high-power optical amplifiers is a case where there is an inadvertent fiber pinch in fiber carrying high power light from the high-power amplifiers. A tight bend can cause a large fraction of the light to exit the fiber and to damage the fiber cable itself or equipment that comes in contact with it, or worse to injure a user, for example by burning the fingers that are pinching the fiber. Even worse, this could lead to a fire hazard. Disadvantageously, conventional shutdown/detection mechanisms which rely either on interruption of an OSC signal or high pump back reflection will not detect a fiber pinch. Additionally, as interconnection complexity increases with optical amplifier systems and methods, more and more opportunities exist for fiber pinches near the launch point of the pumps. Thus, there exists a need for optical amplifier safety systems and methods which can detect discontinuities such as a fiber pinch and perform automatic remedial mechanisms based thereon.

BRIEF SUMMARY OF THE INVENTION

In an exemplary embodiment, a method includes provisioning an optical module; determining a baseline for a backscatter signal into the optical module based on the provisioning; continuously monitoring the backscatter signal in the optical module during operation of the optical module to detect variances in power of the backscatter signal; and, upon detecting a decrease in the power of the backscatter signal below a threshold, performing remedial actions associated with the optical module, wherein the threshold is set indicative of a fiber discontinuity at or near a port of the optical module. The threshold can be set based on the backscatter signal being attenuated twice by the fiber discontinuity in that the fiber discontinuity first attenuates an output signal from the optical module and second attenuates the backscatter signal associated with the output signal. The method can further include outputting a signal from the optical module to a fiber; tapping a small portion of power from the signal prior to the signal exiting the optical module; and detecting the backscatter signal from the small portion of power, wherein the backscatter signal is a signal produced by Rayleigh backscattering (RBS) of the signal in the fiber. The method can further include provisioning the optical module ensuring losses and back reflections of the signal into a fiber from the optical module are at acceptable levels; and determining the baseline for the backscatter signal based on the acceptable levels, wherein the backscatter signal is a signal produced by Rayleigh backscattering (RBS) of the signal in the fiber.

The method can further include performing an optical time domain reflectometer (OTDR) function on the fiber to ensure the acceptable levels, wherein the OTDR function is performed by the optical module. The backscatter signal can be continuously monitored at wavelengths of interest based on a high powered output signal from the optical module. The method can further include performing the remedial actions including at least one of raising an alarm, reducing optical power output of the optical module, reducing optical pump power in the optical module, and shutting off optical pumps in the optical module. The method can further include, upon detecting an open connection through monitoring the backscatter signal, turning off at least one optical component in the optical module. The method can further include continuously monitoring a signal associated with an optical component internal to the optical module; and, upon detecting a change in a ratio of power of the backscatter signal to the signal, performing remedial actions associated with the optical module.

In another exemplary embodiment, an optical module includes at least one optical device within the optical module associated with a high powered optical signal; a line port from which the high powered optical signal exits the optical module into a fiber span; a photodetector coupled to the line port and configured to measure optical power of a backscatter signal from the fiber span associated with high powered optical signal; and circuitry communicatively coupled to the photodetector and the at least one optical device, the circuitry configured to detect a decrease in the power of the backscatter signal below a threshold and perform a remedial action on the at least one optical device based thereon, wherein the threshold is set indicative of a fiber discontinuity at or near the line port. The threshold can be set based on the backscatter signal being attenuated twice by the fiber discontinuity in that the fiber discontinuity first attenuates an output signal from the optical module and second attenuates the backscatter signal associated with the output signal. The optical module can further include an optical power tap tapping a small portion of optical power from the line port to the photodetector, wherein the circuitry detects the backscatter signal from the photodetector the small portion of optical power, wherein the backscatter signal is a signal produced by Rayleigh backscattering (RBS) of the signal in the fiber.

The circuitry can be set with the threshold subsequent to performing fiber tests on the span fiber and ensuring losses and back reflections of the high powered optical signal into the span fiber are at acceptable levels. The optical module can further include an optical time domain reflectometer (OTDR) function configured to determine if the span fiber is at the acceptable levels. The optical module can further include a second photodetector coupled to the least one optical device and the circuitry and configured to measure optical power of an internal signal from the least one optical device; wherein the circuitry is configured to detect a change in a ratio of power of the backscatter signal to the internal signal and perform the remedial action based thereon.

In yet another exemplary embodiment, an optical amplifier includes at least one optical pump within the optical amplifier associated with or amplifying a high powered optical signal;

a line port from which the high powered optical signal exits the optical amplifier into a fiber span; a photodetector coupled to the line port and configured to measure optical power of a backscatter signal from the fiber span associated with high powered optical signal; and circuitry communicatively coupled to the photodetector and the at least one optical device, the circuitry configured to detect a fiber discontinuity based on monitoring the backscatter signal and perform a remedial action on the at least one optical pump based thereon. Optionally, the optical amplifier is in a Raman amplifier configuration; the circuitry is configured to detect a change in the backscatter signal below a threshold; the threshold is set indicative of a fiber discontinuity at or near the line port; and the threshold is set based on the backscatter signal being attenuated twice by the fiber discontinuity in that the fiber discontinuity first attenuates an output signal from the optical module and second attenuates the backscatter signal associated with the output signal. The at least one optical pump can include at least one Raman pump, and wherein the backscatter signal can be a signal produced by Rayleigh backscattering (RBS) of the signal in the fiber at wavelengths of the at least one Raman pump. The optical amplifier can further include components integrated within the optical amplifier to perform an optical time domain reflectometer (OTDR) function; wherein the OTDR function is utilized to ensure acceptable conditions on the fiber span, and once the acceptable conditions on the fiber span are determined, a baseline is established for the backscatter signal with the remedial action being performed if the backscatter signal is at a power level of the baseline minus the threshold. Alternatively, the optical amplifier includes an erbium doped fiber amplifier (EDFA), wherein the at least one optical pump is coupled to a spool of erbium doped fiber in the optical amplifier, and the optical amplifier further includes a second photodetector coupled to an output of the erbium doped fiber and configured to measure optical power of a signal from the erbium doped fiber; wherein the circuitry is configured to detect a change in a ratio of power of the backscatter signal to the signal and perform the remedial action based thereon.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, high-powered optical module safety systems and methods are described which can detect discontinuities such as a fiber pinch and perform automatic remedial mechanisms based thereon. The high-powered optical module safety systems and methods provide an automatic mechanism to detect and quickly shutdown or reduce amplifier power before any significant damage can occur. The high-powered optical module safety systems and methods can apply to Raman amplifiers and/or EFDAs. Advantageously, the high-powered optical module safety systems and methods solve an important safety problem for users of high-power amplifiers in an efficient implementation that can reuse components typically are already in place in most Raman amplifiers and EDFAs, therefore adding little to no cost.

Variously, the high-powered optical module safety systems and methods monitor a backscattered signal to detect fiber pinches. Advantageously, the use of the backscattered signal provides high sensitivity to fiber pinches because the backscattered signal experiences double attenuation due to any fiber pinch, i.e. once as the signal leaves the amplifier and again as the backscattered signal returns to the amplifier. The high-powered optical module safety systems and methods are also selective in that fiber pinches occurring at a distance (e.g., >20 km) from a launch point can be distinguished and therefore not implement remedial measures. Further, the high-powered optical module safety systems and methods can shut down or reduce power of pumps in less than 1 millisecond thereby preventing damage and/or injury.

Figure 1:
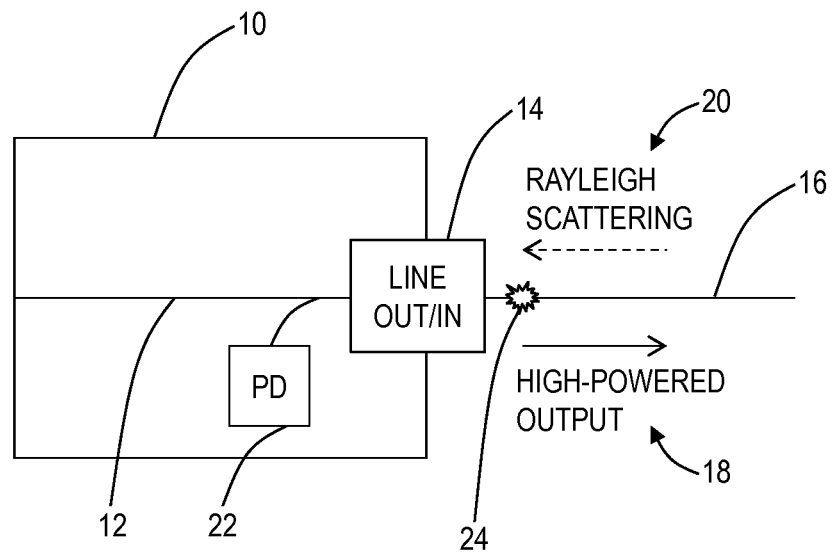
FIG. 1 is a block diagram of an optical system configured to detect proximate fiber pinches and take remedial action based thereon.

Referring to FIG. 1, in an exemplary embodiment, a block diagram illustrates an optical system 10 configured to detect proximate fiber pinches and take remedial action based thereon. The optical system 10 includes a line 12 through which light traverses through the optical system 10 exiting through a line out port 14 onto fiber 16. The line out port 14 is configured to provide a high-powered output 18 to the fiber 16 and receive a backscattered signal 20 (i.e., through Rayleigh backscattering) from the fiber 16. In an exemplary embodiment, the optical system 10 can include an optical amplifier module such as an EDFA, Raman amplifier, etc. The optical system 10 can also be other types of optical modules, e.g. transmitters, etc. Note, the port 14 is labeled a "line out/in" port. In some exemplary embodiments, the port 14 can be a line out port such as for an EDFA, a transmitter, a Raman amplifier with co-propagation in the fiber 16, etc. In other exemplary embodiments, the port 14 can be a line in port such as for a Raman amplifier with counter-propagation in the fiber 16. The optical system 10 further includes a photodetector (PD) 22 coupled to the line 12 for detecting the backscattered signal 20. Note, the photodetector 22 can be coupled to the line 12 via a small optical power tap or the like. It should be appreciated by those of ordinary skill in the art that the optical system 10 is depicted in an oversimplified manner, and a practical embodiment may include additional components and suitably configured processing logic to support known or conventional operating features that are not described in detail herein.

The optical system 10 as an amplifier module can also include one or more pump modules (not shown in FIG. 1) coupled to or in line with the line 12 for providing high-powered pump light. Note, the type of pump lasers is specific to the type of amplifier of the optical system 10, i.e. a Raman amplifier or EDFA. For example, a Raman amplifier would have pump lasers outputting to the fiber 16 through the line out port 14. An EDFA would have pump lasers outputting to a spool of erbium doped fiber within the system 10. Independent of the type of amplifier in FIG. 1, the optical system 10 is illustrated to show components in amplifiers used in the optical amplifier safety systems and methods. Specifically, virtually all conventional amplifiers including Raman amplifiers and EDFAs will utilize the general structure of the optical system 10. In the conventional sense, the photodetector 22 is referred to as a pump back reflection monitor that is used in conventional systems and methods to detect an open connector for laser eye safety.

To detect a fiber pinch 24 in the fiber 16, the optical system 10 utilizes the photodetector 22 to continuously monitor the backscattered signal. In an exemplary embodiment, the photodetector 22 can be the same pump back reflection monitor used to detect an open connector for laser eye safety. For example, in a Raman amplifier, the photodetector 22 is normally used to detect high back reflections, providing a safety shutdown mechanism in the case of an open connector. However, even in the absence of any reflections from connectors, splices or other components, the photodetector 22 always sees the backscattered signal 20 produced by the Rayleigh backscattering of the pump light. The fiber pinch 24 located near the launch point (i.e., the line port 14) of the Raman pumps will cause the backscattered signal 20 to be attenuated twice: once because the high-powered output 18 itself is attenuated and once more because the Rayleigh backscattering generated downstream will come back through the pinch 24 as the backscattered signal 20. Therefore the fiber pinch 24 producing a loss of 1 dB can cause up to 2 dB attenuation in the backscattered signal 20. This concept can also be applied to an EDFA, which often includes a back reflection monitor, i.e., the photodetector 22, at the EDFA output, where the high power is present. As with the Raman amplifier, the fiber pinch 24 near the EDFA output will cause the backscattered signal 20 due to Rayleigh scattering to decrease below its normal level, so the back reflection monitor can be used to detect the pinch 24 and trigger remedial actions. Additionally, other types of optical modules are also supported such as optical transmitters or transceivers which will also have a similar structure as the optical module 10 for detecting open connections that can be used to implement the high-powered optical module safety systems and methods.

Figure 2:
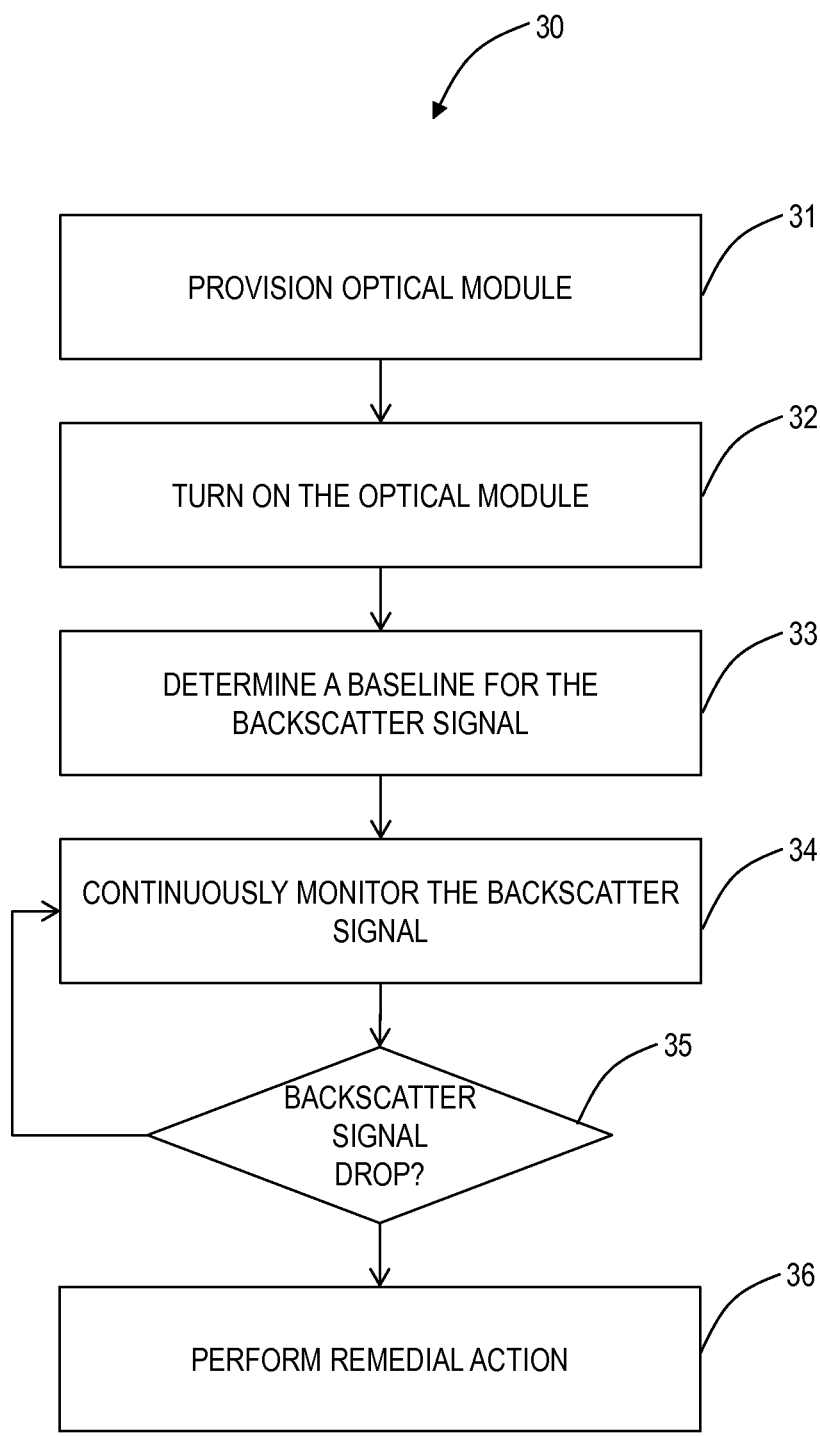
FIG. 2 is a flowchart of a method for an optical amplifier system to detect proximate fiber pinches and take remedial action based thereon.

Referring to FIG. 2, in an exemplary embodiment, a flowchart illustrates a method 30 for an optical system to detect proximate fiber pinches and take remedial action based thereon. The method 30 can be implemented by the optical system 10. The method 30 includes provisioning an optical module (step 31). The provisioning is contemplated with respect to installation of the optical module in the field within an optical communication system. Here, the optical module is installed and provisioned ensuring no high back reflections (e.g., open connectors) or high loss (e.g., fiber pinch, bad splices) components are present in the fiber 16. In an exemplary embodiment, the provisioning can be facilitated by the use of an optical time domain reflectometer (OTDR) function. This OTDR function can be integrated or performed by the optical module or by another device. Next, the method 30 includes turning on the optical module (step 32). Here, once provisioning is complete, the optical module is "lit" up whereby the associated components in the optical module are powered up. For example, if the optical module is a Raman amplifier, Raman pumps can be turned on to achieve a targeted Raman gain. If the optical module is an EDFA, the internal pumps can be turned on to achieve a targeted EDFA gain. If the optical module is a transmitter, internal lasers and modulator components can be turned on.

The method 30 includes determining a baseline for the backscattered signal 20 received by the photodetector 22. This includes measuring and determining an expectation of the backscattered signal 20 under normal conditions, i.e. after initial turn-up with little or no high back reflections or high loss in the fiber 16. The baseline is what the optical system 10 expects to see (i.e., in terms of power) from the backscattered signal 20 without discontinuities present such as the fiber pinch 24. Note, the steps 31, 32, 33 are performed during installation and provisioning of the optical system 10. During operation of the optical system 10, the photodetector 22 can continuously monitor the backscatter signal 20 (step 34). During this continuous monitoring, the photodetector 22 is configured to detect a drop in power of the backscatter signal 20 below a certain predetermined threshold (step 35). The drop in power is indicative of the fiber pinch 24. Note, the backscatter signal 20 is continuously monitored for power at various wavelengths of interest such as based on pumps or other devices in the optical system 10, output wavelengths in the optical system 10, etc. Specifically, the backscatter signal 20 is based on the Rayleigh backscattering of an output signal from the optical system 10 which is at the wavelengths of interest in the optical system 10. The wavelengths of interest can be Raman pump laser wavelengths, WDM signal wavelengths, etc.

In an exemplary embodiment, the drop in power can be the baseline power minus 2 dB although other values are also contemplated. Upon detecting the drop in power below the predetermined threshold, the method 30 can include remedial actions (step 36). The remedial actions can include an alarm, warning, etc. to notify system operators of the fiber pinch 24 such as through a network management system (NMS), element management system (EMS), etc. In an exemplary embodiment, the remedial actions can include shutting off power to pumps or other devices in the optical system 10. In another exemplary embodiment, the remedial actions can include reducing power to the pumps or other devices in the optical system 10. Note, it may be preferable to avoid shutting off the power to avoid further traffic disruption, and to lower the pump power instead. Of course, various combinations of the aforementioned remedial actions are also contemplated.

In addition to the foregoing, those of ordinary skill in the art will recognize the systems and methods can also apply to other high-powered optical modules in addition to optical amplifiers. The descriptions herein are presented with respect to optical amplifiers for illustration purposes, and those of ordinary skill in the art will recognize that other optical modules can have laser output powers comparable to optical amplifier modules. For example, the systems and methods contemplate use with optical transceivers, transmitters, etc. Optical transmitter modules can have a similar architecture as the optical amplifier system 10, i.e. the photodetector 22 monitoring the backscattered signal 20. Thus, the method 30 can equally apply to any optical transmitter modules or the like. Additionally, the present disclosure utilizes the term "optical module" but those of ordinary skill in the art will recognize this could be any physical implementation of an optical device with an output to the fiber 16. That is, the optical module could also be a line card, a plug-in, a blade, a subsystem, or any other optoelectronic device.

Figure 3:
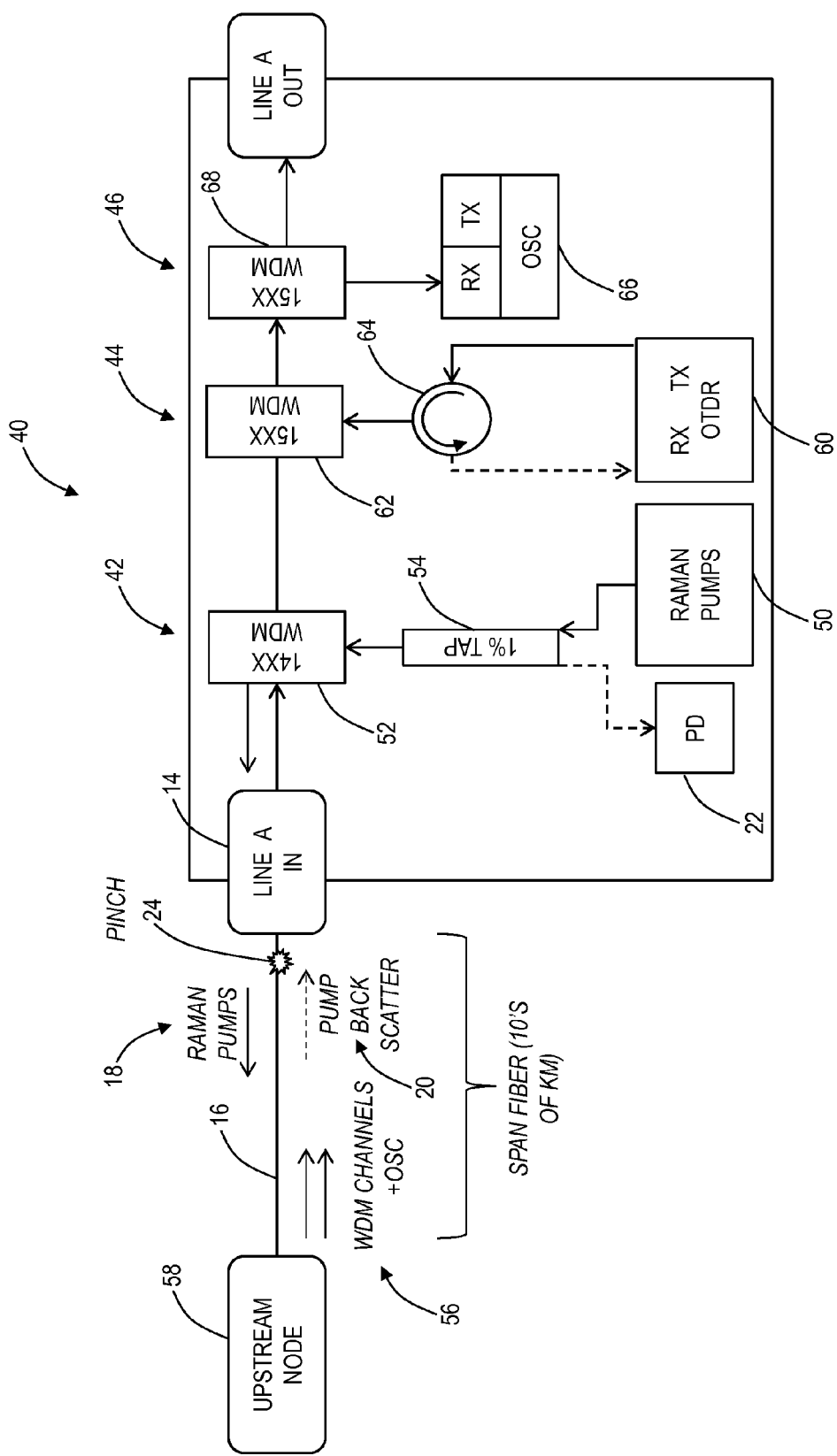
FIG. 3 is a block diagram of an exemplary Raman amplifier configured to detect proximate fiber pinches and take remedial action based thereon.

Referring to FIG. 3, in an exemplary embodiment, a block diagram illustrates an exemplary Raman amplifier 40 configured to detect proximate fiber pinches and take remedial action based thereon. The Raman amplifier 40 is a specific case of the optical system 10 and can be configured to implement the method 30. The Raman amplifier 40 can be grouped into three internal subsystems 42, 44, 46, namely a pump delivery subsystem 42, an OTDR subsystem 44, and an optical service channel (OSC) subsystem 46. Of course, other configurations of the Raman amplifier 40 are also contemplated herein. For example, the subsystems 44, 46 can be optional in realizing the Raman amplifier 40. For illustration purposes, the Raman amplifier 40 includes counter-propagation by the pump delivery subsystem 42. Again, other types of propagation are also contemplated such as co-propagating or counter/co-propagating. Those of ordinary skill in the art will recognize that the Raman amplifier 40 is presented as an exemplary embodiment, and the systems and methods described herein contemplate use with any embodiment of a Raman amplifier. Also, it should be appreciated by those of ordinary skill in the art that the Raman amplifier 40 is depicted in an oversimplified manner, and a practical embodiment may include additional components and suitably configured processing logic to support known or conventional operating features that are not described in detail herein.

The pump delivery subsystem 42 includes one or more Raman pumps 50 coupled to a wavelength division multiplexing (WDM) filter 52 via an intermediate power tap 54 which taps a small amount of power (e.g., 1%) off to the photodetector 22. In operation, the Raman pumps 50 are configured to launch high power in the 1400-1500 nm range into the span fiber 16 to create Raman gain for counter-propagating WDM channels 56 from an upstream node 58. Note, the WDM channels 56 can also include an OSC which can also receive the Raman gain. The Raman pumps 50 are coupled to the span fiber 16 through the WDM filter 52 which connects to the line port 14. In the Raman amplifier 40, the photodetector 22 and tap 54 operates as a back reflection monitor, which captures approximately 1% of any pump light reflected or scattered back into the Raman amplifier.

The OTDR subsystem 44 includes an OTDR RX/TX device 60 coupled to a WDM filter 62 via an optical circulator 64. In the example of FIG. 3, the OTDR subsystem 44 launches a pulse via the OTDR RX/TX device 60 at 1527 nm into the span fiber 16 via the optical circulator 64 and the WDM filter 62. The OTDR RX/TX device 60 captures any 1527 nm light that is reflected of backscattered as the pulse propagates through the span fiber 16. A time resolved trace of the received signal provides a measure of fiber losses and connector reflections. The OTDR subsystem 44 is not necessary for the Raman amplifier 40 and can be realized in an external device or not used at all. In an exemplary embodiment, the OTDR subsystem 44 is useful for establishing a baseline for what the backscatter signal should be in the absence of fiber discontinuities or other issues. The OSC subsystem 46 is shown with the RX direction only for illustration purposes. The OSC subsystem 46 includes an OSC device 66 coupled to a WDM filter 68. For example, the OSC device 66 can be a 1511 nm OSC that is used to transmit system data from node to node and also to help detect fiber cuts. A safety shutdown of the Raman pumps 50 can be triggered in the event of an OSC loss of signal (LOS) or loss of frame (LOF).

The Raman amplifier 40 is illustrated in FIG. 3 with the fiber pinch 24 at or near the line port 14. The presence of the fiber pinch 24 near the launch point of the Raman pumps 50 causes the backscattered signal 20 captured in the photodetector 22 to be doubly attenuated as both the pump light 18 and the backscatter signal 20 pass through the fiber pinch 24. The OTDR subsystem 44 can be used to make sure that no high loss or high back reflection points are present before taking a baseline of the pump back reflection signal, i.e. the backscattered signal 20. Once the baseline is established for the backscattered signal 20 being monitored by the photodetector 22, in the event of the fiber pinch 24 near the launch point of the Raman pumps 50 (i.e., the line port 14), all signals passing through that location will experience an increase in insertion loss. As described herein, a loss of a few dB's will typically not be sufficient to cause the OSC to go into LOS or LOF, but can still be considered a safety hazard as it can result in hundreds of mW of pump light suddenly escaping the fiber through bend loss.

To detect a fiber pinch, the high-powered optical module safety systems and methods monitor the backscattered signal 20 that is produced by Rayleigh backscattering (RBS) of the pump light. This backscatter signal 20 occurs in all fiber types (with varying efficiency) and is proportional to the amount of pump light propagating into the span fiber 16. Assuming low insertion losses and no high back reflection points (e.g., as determined initially by the OTDR subsystem 44), the RBS coefficient of the pump light is in the −30 dB range. Assuming 30 dBm of Raman pump power and a 1% (−20 dB) tap ratio for the back reflection monitor, the back reflection photodetector 22 will see a RBS signal in the −20 dBm range, which is easily detectable. The fiber pinch 24 near the line port 14 with a loss of x dB will cause the RBS signal to drop by 2x dB, since the fiber pinch 24 attenuates the pump light first as it enters the span fiber 16 and a second time at it scatters back towards the Raman amplifier card. This makes the proposed detection mechanism described herein very sensitive to the fiber pinch 24 or other fiber discontinuities in the fiber 16.

In an exemplary operation with the Raman amplifier 40, the Raman amplifier 40 is provisioned ensuring that no high back reflections (e.g., open connector) or high loss (fiber pinch, bad splice) components are present. In the example of FIG. 3, this can be accomplished by taking an OTDR trace and making sure that losses and back reflections are at an acceptable level using the OTDR subsystem 44, which means in particular that no fiber pinch should be present. Next, once the acceptable levels are determined, the Raman pumps 50 are turned on and set to achieve a target Raman gain. This will produce a small signal in the pump back reflection monitor (i.e., the photodetector 22) due to Rayleigh backscattering of the pump light. This reflected signal is measured at the pump wavelengths using the photodetector 22. This measurement can set the baseline value and an alarm threshold can be set below this baseline (e.g. at [baseline −2 dB], which will trigger if there is a fiber pinch producing a 1 dB loss or greater). In operation, the Raman amplifier 40 constantly monitors the pump back reflection and if the signal drops below the alarm threshold, remedial actions are performed such as at least one of raising an alarm, reducing optical power output of the optical module, reducing optical pump power in the optical module, and shutting off optical pumps in the optical module.

The fiber pinch 24 is only a safety hazard if it occurs where the Raman pump power is high, i.e. within the first 10-20 km from the launch point. Advantageously, because the described systems and methods rely on detection of the pump light itself; it will be insensitive to a fiber pinch occurring outside of this critical area thereby not triggering a safety shutdown if there is no safety concern. The reaction time of this shutdown mechanism will be primarily limited by the transit time of the pump light through the span fiber 16. The pump light is absorbed in the first 20 km or so of the span fiber, so on average the backscattered pump light travels a round trip of about 20 km, which takes approximately 100 us. Therefore the fiber pinch 24 will be detected ~100 us after it has occurred. This is much faster than the time needed to create the pinch itself or the time needed to cause damage or injury, so this is an effective method.

Figure 4:
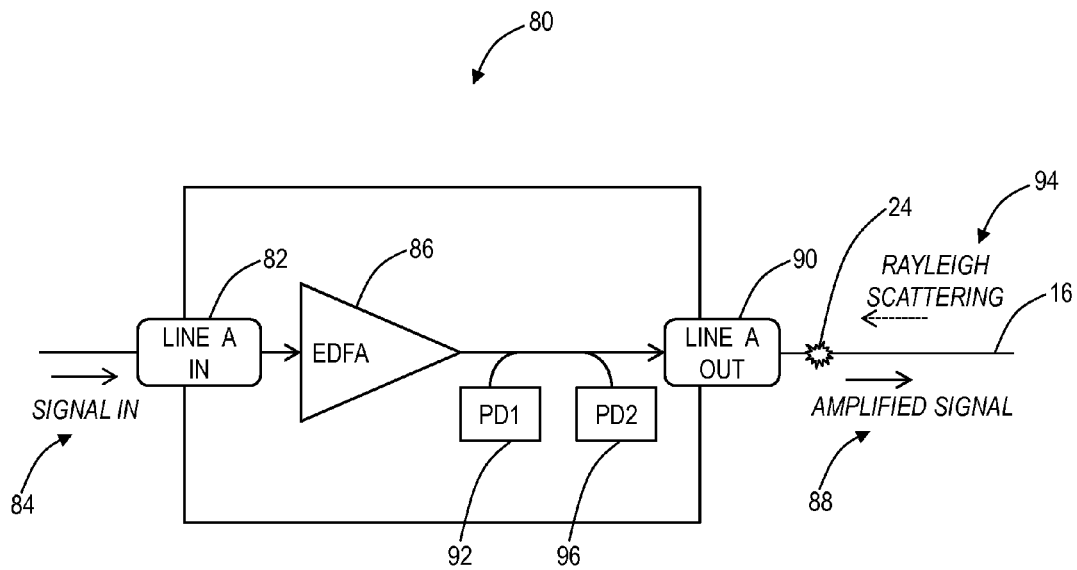
FIG. 4 is a block diagram of an exemplary EDFA configured to detect proximate fiber pinches and take remedial action based thereon.

Referring to FIG. 4, in an exemplary embodiment, a block diagram illustrates an exemplary EDFA 80 configured to detect proximate fiber pinches and take remedial action based thereon. The EDFA 80 is another specific case of the optical system 10 and can be configured to implement the method 30.

The exemplary EDFA 80 includes a line in port 82 receiving a WDM signal 84 and providing the WDM signal 84 to erbium doped fiber 86. At a high level, the erbium doped fiber 86 is a spool of fiber doped with erbium with pumps (e.g., 980 nm and/or 1480 nm) pumping the doped fiber. The erbium doped fiber 86 acts as a gain medium for the WDM signal 84. The erbium doped fiber 86 provides an amplified signal 88 of the WDM signal 84 out a line out port 90. Those of ordinary skill in the art will recognize that the EDFA 80 is presented as an exemplary embodiment, and the systems and methods described herein contemplate use with any embodiment of an EDFA or other type of doped fiber amplifier. Also, it should be appreciated by those of ordinary skill in the art that the EDFA 80 is depicted in an oversimplified manner, and a practical embodiment may include additional components and suitably configured processing logic to support known or conventional operating features that are not described in detail herein.

The foregoing methods described herein can also be used to provide safety mechanism for high-power EDFAs such as the EDFA 80. For the EDFA 80, two power monitors can be used, a first photodetector (PD1) 92 connected to a splitter that taps off part of a back reflected signal 94 coming into the line out port 90 and a second photodetector (PD2) 96 used to monitor the output power of the erbium doped fiber 86, i.e. a signal internal in the EDFA 80. In the absence of the fiber pinch 24, the ratio of the PD1 92 and PD2 96 signals should be proportional to the Rayleigh backscattering coefficient of the transmission fiber 16 at the signal wavelength. To first order, and in the absence of significant Brillouin scattering, that ratio should be independent of the input signal power or amplifier gain. If the fiber pinch 24 is introduced near the line out port 90, then the PD1/PD2 ratio will drop rapidly as both the outgoing signal and the RBS become attenuated.

Again, the presence of the fiber pinch 24 near the output of the EDFA 80 causes the backscattered pump light captured by the back reflection monitor (PD1 92) to be doubly attenuated as both the output signal light and the Rayleigh backscattering pass through the fiber pinch 24. The PD2 96 is used to measure the output power of the erbium doped fiber 86. The fiber pinch 24 can be detected if the ratio of PD1 over PD2 falls below an expected value. Thus, the presence of the PD1 92 and the PD2 96 removes a requirement to measure a baseline through provisioning. Rather, the fiber pinch 24 can be detected based on ratio changes. Alternatively, the EDFA 80 could omit the PD2 96 and detect the fiber pinch 24 in a similar manner as the Raman amplifier 40, i.e. based on a drop below a baseline.

Figure 5:
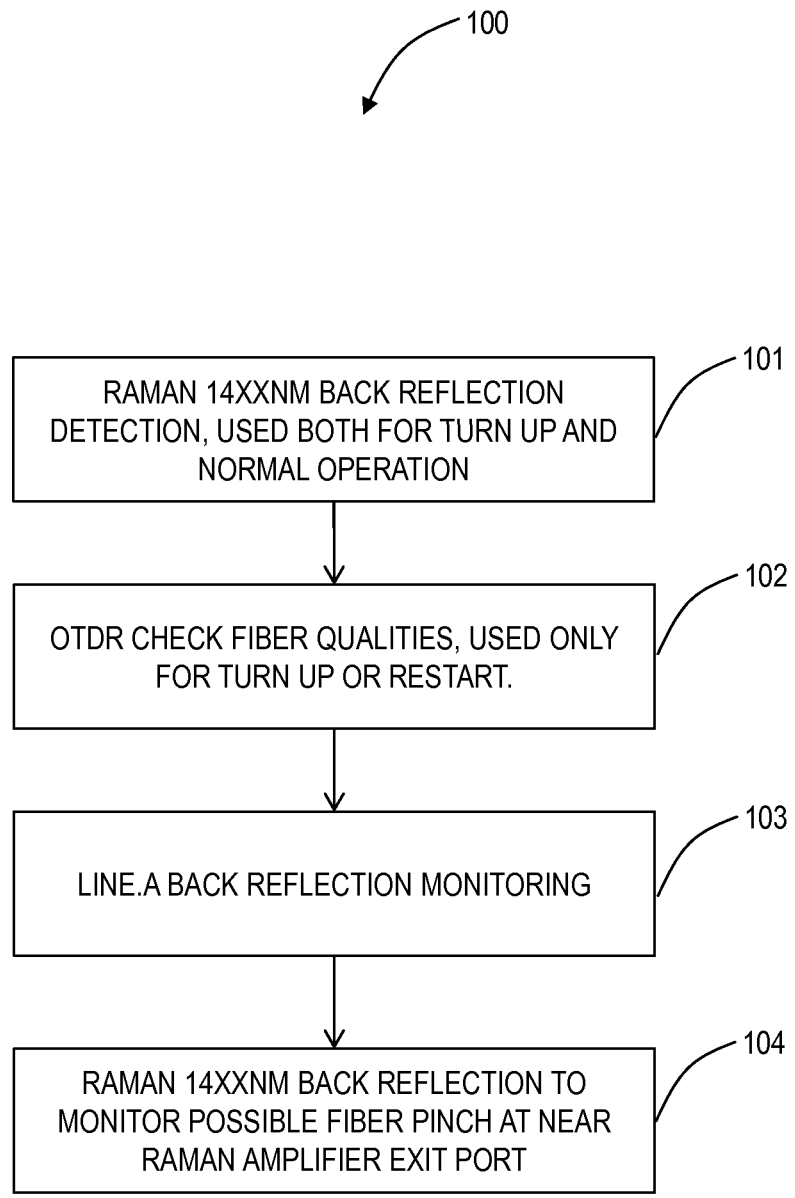
FIG. 5 is a flowchart of a Raman amplifier safety method to detect proximate fiber pinches and take remedial action based thereon.

Referring to FIG. 5, in an exemplary embodiment, a flowchart illustrates a Raman amplifier safety method 100 to detect proximate fiber pinches and take remedial action based thereon. In an exemplary embodiment, the Raman amplifier safety method 100 can be implemented by the Raman amplifier 40 and the like. In an exemplary Embodiment, the Raman amplifier 40 can have a high power output such as up to 1 W or more. As such, the Raman amplifier 40 needs to be able to detect problems (e.g., open connector, fiber cut, fiber pinches, etc.) and take remedial action such as shutting down in the ranges of 100 ms or less. The Raman amplifier safety method 100 includes the fiber pinch methods described herein as well as other safety detection and shutoff techniques (e.g., for high back reflection or open connectors).

Variously, a Raman amplifier would need to pass the first two steps 101, 102 in the Raman amplifier safety method 100 to function. The foregoing steps of the Raman amplifier safety method 100 are labeled for turn up, restart, normal operation, etc., i.e. when these steps are determinative. The Raman amplifier safety method 100 includes Raman 14xxnm back reflection detection, used both for turn up and normal operation (step 101). Here, the Raman amplifier is looking at the back reflection for all Raman pumps in the amplifier (in a Continuous Wave fashion). This is looking at back reflection on all line ports (co and/or counter propagating) at all pump wavelengths. Based on estimates, back reflection threshold may be around −27 dB although this could vary as well based on the implementation and fiber type. Next, the Raman amplifier safety method 100 includes an OTDR check of fiber quality, which could be used only for turn up or restart (step 102). The OTDR identifies connector loss, reflection, fiber attenuation, etc. and can decide if the fiber is good enough or not to turn on the Raman amplifier. Note, this decision can be automated, manual, or a combination thereof.

The Raman amplifier safety method 100 further includes monitoring Line A back reflection, during normal operation (step 103). In an exemplary embodiment, the Raman amplifier can support two fibers, A and B. In an exemplary embodiment, Line A represents counter propagation by the Raman amplifier. Here, when detect the Line A back reflection monitor detects a higher back reflection, it may need shutdown the Raman amplifier if the Line A power is above a certain amount (e.g., >3 dBm). Finally, the Raman amplifier safety method 100 includes Raman 14xxnm back reflection monitoring to detect possible fiber pinches at or near the Raman amplifier exit port (step 104). As described herein, after Raman turn up, 14xxnm back reflection value is recorded as a value BR_0 (typical~−30 dB). If 14xxnm back reflection is reduced by a threshold such as 2 dB (<BR_0 −2 dB), it means fiber has about 1 dB pinch loss leading the Raman amplifier to take remedial actions.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Specifically, the optical system 10 and the amplifiers 40, 80 can include circuitry communicatively coupled to the various devices contained therein for receiving data (e.g., power measurements), performing comparisons, and commanding the remedial actions. For example, the circuitry in the optical system 10 can be communicatively coupled to the photodetector 22 and any optical devices associated with the high-powered output 18. Together with the photodetector 22, the circuitry can perform the method 30. For example, the circuitry can be configured to detect a decrease in the power of the backscatter signal 20 below the threshold and perform the remedial action on at least one optical device in the optical system 10 based thereon, wherein the threshold is set indicative of a fiber discontinuity at or near the line port 14. Similarly, in the Raman amplifier 40, the circuitry can be communicatively coupled to the Raman pumps 50, the photodetector 22, the OTDR 60, the OSC 66, and the like, and enable performance of the methods 30, 100 in the Raman amplifier 40. Similarly, the circuitry, in the EDFA 80, can be communicatively coupled to the EDFA 86 and the photodetectors 92, 96 for performing the method 30.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A method, comprising:
provisioning an optical module;
determining a baseline for a backscatter signal into the optical module based on the provisioning;
continuously monitoring the backscatter signal in the optical module during operation of the optical module to detect variances in power of the backscatter signal; and
upon detecting a decrease in the power of the backscatter signal below a threshold, performing remedial actions associated with the optical module, wherein the threshold is set indicative of a fiber discontinuity at or near a port of the optical module;
wherein the threshold is set based on the backscatter signal being attenuated twice by the fiber discontinuity in that the fiber discontinuity first attenuates an output signal from the optical module and second attenuates the backscatter signal associated with the output signal.

2. The method of claim 1, further comprising:
outputting a signal from the optical module to a fiber;
tapping a small portion of power from the signal prior to the signal exiting the optical module; and
detecting the backscatter signal from the small portion of power, wherein the backscatter signal is a signal produced by Rayleigh backscattering (RBS) of the signal in the fiber.

3. The method of claim 1, further comprising:
provisioning the optical module ensuring losses and back reflections of the signal into a fiber from the optical module are at acceptable levels; and
determining the baseline for the backscatter signal based on the acceptable levels, wherein the backscatter signal is a signal produced by Rayleigh backscattering (RBS) of the signal in the fiber.

4. The method of claim 3, further comprising:
performing an optical time domain reflectometer (OTDR) function on the fiber to ensure the acceptable levels, wherein the OTDR function is performed by the optical module.

5. The method of claim 1, wherein the backscatter signal is continuously monitored at wavelengths of interest based on a high powered output signal from the optical module.

6. The method of claim 1, further comprising:
performing the remedial actions comprising at least one of raising an alarm, reducing optical power output of the optical module, reducing optical pump power in the optical module, and shutting off optical pumps in the optical module.

7. The method of claim 1, further comprising:
upon detecting an open connection through monitoring the backscatter signal, turning off at least one optical component in the optical module.

8. The method of claim 1, further comprising:
continuously monitoring a signal associated with an optical component internal to the optical module; and
upon detecting a change in a ratio of power of the backscatter signal to the signal, performing remedial actions associated with the optical module.

9. An optical module, comprising:
at least one optical device within the optical module associated with a high powered optical signal;
a line port from which the high powered optical signal exits the optical module into a fiber span;
a photodetector coupled to the line port and configured to measure optical power of a backscatter signal from the fiber span associated with high powered optical signal; and
circuitry communicatively coupled to the photodetector and the at least one optical device, the circuitry configured to detect a decrease in the power of the backscatter signal below a threshold and perform a remedial action on the at least one optical device based thereon, wherein the threshold is set indicative of a fiber discontinuity at or near the line port;
wherein the threshold is set based on the backscatter signal being attenuated twice by the fiber discontinuity in that the fiber discontinuity first attenuates an output signal from the optical module and second attenuates the backscatter signal associated with the output signal.

10. The optical module of claim 9, further comprising:
an optical power tap tapping a small portion of optical power from the line port to the photodetector, wherein the circuitry detects the backscatter signal from the photodetector the small portion of optical power, wherein the backscatter signal is a signal produced by Rayleigh backscattering (RBS) of the signal in the fiber.

11. The optical module of claim 9, wherein the circuitry is set with the threshold subsequent to performing fiber tests on the span fiber and ensuring losses and back reflections of the high powered optical signal into the span fiber are at acceptable levels.

12. The optical module of claim 11, further comprising:
an optical time domain reflectometer (OTDR) function configured to determine if the span fiber is at the acceptable levels.

13. The optical module of claim 9, further comprising:
a second photodetector coupled to the least one optical device and the circuitry and configured to measure optical power of an internal signal from the least one optical device;
wherein the circuitry is configured to detect a change in a ratio of power of the backscatter signal to the internal signal and perform the remedial action based thereon.

14. An optical amplifier, comprising:
at least one optical pump within the optical amplifier associated with or amplifying a high powered optical signal;

a line port from which the high powered optical signal exits the optical amplifier into a fiber span;

a photodetector coupled to the line port and configured to measure optical power of a backscatter signal from the fiber span associated with high powered optical signal; and circuitry communicatively coupled to the photodetector and the at least one optical device, the circuitry configured to detect a fiber discontinuity based on monitoring the backscatter signal and perform a remedial action on the at least one optical pump based thereon;

wherein the optical amplifier comprises an erbium doped fiber amplifier (EDFA), wherein the at least one optical pump is coupled to a spool of erbium doped fiber in the optical amplifier, and the optical amplifier further comprising:

a second photodetector coupled to an output of the erbium doped fiber and configured to measure optical power of a signal from the erbium doped fiber;

wherein the circuitry is configured to detect a change in a ratio of power of the backscatter signal to the signal from the erbium doped fiber and perform the remedial action based thereon.

15. The optical amplifier of claim 14, wherein:
the optical amplifier is in a Raman amplifier configuration;
the circuitry is configured to detect a change in the backscatter signal below a threshold;
the threshold is set indicative of a fiber discontinuity at or near the line port; and
the threshold is set based on the backscatter signal being attenuated twice by the fiber discontinuity in that the fiber discontinuity first attenuates an output signal from the optical module and second attenuates the backscatter signal associated with the output signal.

16. The optical amplifier of claim 15, wherein the at least one optical pump comprises at least one Raman pump, and wherein the backscatter signal is a signal produced by Rayleigh backscattering (RBS) of the signal in the fiber at wavelengths of the at least one Raman pump.

17. The optical amplifier of claim 15, further comprising:
components integrated within the optical amplifier to perform an optical time domain reflectometer (OTDR) function;

wherein the OTDR function is utilized to ensure acceptable conditions on the fiber span, and once the acceptable conditions on the fiber span are determined, a baseline is established for the backscatter signal with the remedial action being performed if the backscatter signal is at a power level of the baseline minus the threshold.

* * * * *